3,783,085
PROTECTIVE MATERIALS

William Michael Pearson, Halifax, and Anthony Pearson, Bradford, England, assignors to Bondina Limited, Halifax, England No Drawing. Original application Jan. 6, 1969, Ser. No. 789,406, now Patent No. 3,674,593. Divided and this application July 9, 1971, Ser. No. 161,313

Claims priority, application Great Britain, Jan. 19, 1968, 3,099/68

Int. Cl. A62b 17/00; A41d 13/00; B32b 5/16
U.S. Cl. 161—87                                       1 Claim

ABSTRACT OF THE DISCLOSURE

A protective material, suitable for making up into protective garments, is formed by interposing powdered activated charcoal and powdered thermoplastic adhesive between two substrates and heat-sealing the assembly together. A microfine thermoplastic powder may also be interposed, and this has the effect of counteracting undesirable effects due to any dust which may be present in the charcoal.

CROSS-REFERENCE TO A RELATED APPLICATION

This application is a division of application Ser. No. 789,406, led Jan. 6, 1969, now Pat. No. 3,674,593, issued July 4, 1972.

The invention relates to an assembly of materials incorporating a charcoal layer, and is especially concerned with those materials which can be made up into protective garments that will provide protection to the wearer against toxic chemicals and other substances such as might be used, for instance, in agricultural sprays.

The basic requirements for such a material are in many cases contradictory. For example, for the safety of the wearer, the material must not be permeable to harmful vapors and must have a high tensile and tear strength, while, at the same time, for the comfort of the wearer, it must be permeable to air as well as being flexible, thin and light. In practice, all other things being equal, the aim is to provide a material with the highest possible permeability, and, as a guide, a permeability of about 100 linear feet of air per minute at a pressure difference across the material of ½ inch water gauge has been quoted.

It is known to incorporate activated charcoal into protective materials to absorb liquid or gaseous toxic chemicals coming into contact with them. Woven fabrics are strong and permeable, but droplets of toxic chemicals tend to strike through; if a tightly woven fabric is chosen to reduce this tendency, the incorporation of a charcoal layer may render the fabric impermeable, or reduce its permeability to an unacceptable extent. Non-woven fabrics have the advantage that droplets settling on or coming into contact with them tend to spread on the surface or in the material and do not pass straight through as they would with a woven fabric, but a simple non-woven fabric is too low in tear strength and serious damage can be caused to it, for example, by snagging on barbed wire.

A somewhat stronger fabric which combines the strength of woven fabric with the valuable properties of non-woven fabric can be produced by needling one or more layers of a non-woven fibrous web on to a backing of woven or knitted material and impregnating the resulting composite material with a binder. Conventional binders for non-woven fabrics can be used but where flame resistance is required, a polychloroprene binder vulcanised in situ has proved very satisfactory provided that a suitable antioxidant formulation including zinc oxide as an acid acceptor is present to reduce degradation by light. The resistance to burning may be further improved by the incorporation of antimony trioxide.

In Ser. No. 602,491 there is described and claimed a protective material formed from a composite of a woven or knitted fabric and a non-woven fabric, impregnated with a binder and having a layer of charcoal bonded to one side of the material by a binder composition comprising an acrylate resin. Advantageously the composite of woven or knitted fabric and non-woven fabric may be rendered repellent to both oil and water by treatment with a dispersion of a fluorocarbon resin, such as that sold under the trademark Scotchgard. In practice, the charcoal is applied to the composite by spraying a dispersion of it in binder solution onto the composite, and there is a danger in this method that a proportion of the charcoal, however small, may be carried right through the composite; the liquid repellency of the composite will be destroyed at the points where this occurs.

According to the present invention, a protective material is formed by interposing powdered activated charcoal and powdered thermoplastic adhesive between two substrates, and heat-sealing the assembly together. The activated charcoal is thus present in the protective material as a dry powder, and its absorbency is not reduced by the presence of binder; furthermore, the use of powdered thermoplastic adhesive and non-bonded charcoal results in a protective material having improved handle and softer texture.

The substrates may be woven or non-woven fabrics, composites ow woven and non-woven fabrics, plastic foams, laminates of textile fabric and foam, felts or other similar products, provided that they are of suitable pore size to retain charcoal and to have the desired permeability. Clearly it is desirable that both substrates should have a pore size such that the smallest particles of the powdered charcoal are retained by them. The minimum pore size, and hence the minimum norminal particle size of charcoal which can be used, is connected with the permeability of the material, and while there are no definite limits specified for permeability, it is assumed that, if a protective material is to be made into a garment and worn, the higher the permeability the greater will be the comfort of the wearer. The larger the particle size of the charcoal, however, the greater the weight of charcoal required to obtain adequate distribution of it in the material.

The powdered adhesive should preferably have a nominal particle size equal to or slightly greater than that of the charcoal. For example, for two given substrates, it might be found that the charcoal should ideally all be in the form of particles (say) 100 microns in size, but that in fact a range of particle size of from 180 to 100 microns could be tolerated. The particles of powdered adhesive should then be of such a size that they can strike through the charcoal in the heat-sealing process, and thus bond the assembly together. At the present time, it is preferred that the adhesive should be a non-plasticized thermoplastic polymer, so that contamination of the charcoal particles, for example by constituents of the adhesive, is minimized.

The charcoal and the powdered adhesive may be applied to one or both of the substrate as a mixture of powders. Alternatively, powdered charcoal and powdered adhesive may be applied to one or both of the substrates one after the other, in either order. As a further possibility, powdered charcoal may be applied to one substrate and powdered adhesive to the other. In all cases, conventional powder spreading techniques may be used, and the assembly heat-sealed by conventional methods.

Powdered charcoal is normally produced by grinding; all finely powdered charcoal now commercially available contains a proportion of dust, and samples of nominal particle size 100 microns have been found to contain up to 30% of dusty material of particle size less than 100 microns. While the use of such dusty material in the process according to the invention results in a protective material with excellent protection properties, the dust tends not to be retained in the assembly and to pass through the substrates when the material is flexed. The presence of dusty charcoal on the outer surface of a garment does not seriously affect its oil-repellency properties, but dust passing to the inner surface of a garment is unpleasant for the wearer; under wet conditions, the dust also tends to be flushed through the garment, making conditions even worse for the wearer. We therefore prefer to blend microfine thermoplastic powder with the powdered activated charcoal before interposing the charcoal and the powdered thermoplastic adhesive between the substrates. The microfine thermoplastic powder acts as an inert agent, and bonds the charcoal particles to themselves, and to some extent to the substrates, but the main bonding effect in the material is still provided by the powdered thermoplastic adhesive.

Clearly the microfine powder and the powdered adhesive must be selected so that the conditions necessary to heat-seal the assembly by means of the powdered adhesive activate but do not overactivate the microfine powder; suitable combinations of microfine powdered and powdered adhesives may be chosen on the basis of their respective softening temperatures and melt flow properties. During the heat-sealing step, the conditions of temperature and pressure must be such as to cause the microfine powder to bond the charcoal effectively, but must not be such as to cause it to flow excessively since it would then tend to encapsulate the charcoal. We have found that polyethylenes or chlorinated polyethylenes in the form of microfine powder can be used with conventional polyamide adhesives, and that suitable combinations of conditions of heat and pressure for activating the microfins powder and heat-sealing the assembly can then readily be devised As microfine powder, we prefer to use thermoplastic material of as fine particle size as possible, so that there are the maximum number of particles for any given weight; suitably a substantial proportion of particles, for example 90% or more, are 25 microns or less in size, and preferably the microfine powder should not have an average particle size greater than 70 microns. Naturally the use of microfine powder in the manufacture of a material according to this invention must reduce the absorption capacity of the charcoal. The reduction of capacity observed depends on the proportion of microfine powder used, and in any case this should be kept to a minimum since it represents inert added weight in the material; the quantity of microfine powder to be used in any circumstances will depend on the quantity of dust in the charcoal, and often the use of only very small proportions of microfine powder will substantially reduce the undesirable effects associated with the presence of the dust. For example, it has been found that there are no dust problems under wet or dry conditions with a protective material prepared using a sample of charcoal of nominal particle size 180–100 microns containing 30% of dust if microfine powder having 90% of particles 25 microns or less in size is used in the proportions of 30 parts of powder to 70 parts of charcoal. Any loss of permeability of the material owing to the use of microfine powder may be counterbalanced by the use of more open substrates, the pore size of the substrates being somewhat less critical since the charcoal is bonded; whatever combination of substrates and charcoal is used, however, we still prefer that as much as possible of the charcoal be physically held by the substrates so that there is only need for the minimum of microfine powder.

The pore size of the substrates, the particle sizes of the charcoal, the powdered adhesive and the microfine powder, and the weights of each must be correlated to achieve a protective material having the desired properties.

Apart from toxic gas absorption the other most significant properties generally required are high permeability and low weight. The degree of protection afforded depends on the weight of the charcoal present, but if the weight of charcoal is increased above that required for good cover, then the permeability falls; this point of good cover depends on the particle size of the charcoal. Using charcoal of maximum particle size 180 microns, and 70% from 180 to 100 microns, we find that a satisfactory product is obtained at 40 g./m.$^2$; increased quantities of charcoal give better protection, but at the expense of weight and permeability. Preferably no particles of the charcoal should exceed 300 microns in size, and we have found that a nominal particle size of 100 microns is very satisfactory. The particles of adhesive should be large enough to strike through the charcoal but not so large that they will strike through the assembly on heat-sealing since the presence of adhesive on the surface of a material may be damaging to the repellent properties or may allow wicking through the material. At the same time the particles should preferably not be larger than necessary to achieve this striking-through the charcoal so that the largest possible number of bonding points for a given weight of adhesive can be obtained to confer strength on the finished material. The weight of adhesive can be varied according to the bond strength required from the minimum necessary to heat-seal the composite up to the point where the bond strength exceeds the strength of either substrate.

The preferred manufacturing procedure when we incorporate microfine powder into the material is to blend together the charcoal and the microfine powder, and then to sprinkle the mixture onto the surface of one substrate, generally that one which will form the outer surface of any garment to be produced. On top of the charcoal mixture is sprinkled the powdered adhesive, then the second substrate is superimposed, and the assembly bonded together with suitable conditions of temperature and pressure. Alternatively the powdered adhesive can be sprinkled onto one substrate and the mixture of charcoal and microfine powder sprinkled on top of the adhesive. As a third possibility, the charcoal, the powdered adhesive and the microfine powder can all be mixed together and this mixture sprinkled on one substrate, and the second substrate then superimposed.

As stated above, the microfine powder and the powdered adhesive must be selected so that the conditions necessary to heat-seal the assembly by means of the powdered adhesive activate but do not over-activate the microfine powder. In certain circumstances it is advantageous to prepare the protective material by a two-stage process, different conditions of heating being employed in each stage so as to achieve the desired effect without over-activating the microfine powder. For example, in a first stage, the powdered adhesive may be sprinkled on one substrate and sintered onto it; in a second stage, the mixture of charcoal and microfine powder may then be sprinkled on top, the second substrate superimposed, and the assembly bonded together. Alternatively, the mixture of charcoal and microfine powder may be sprinkled onto one substrate and sintered on it, and the powdered adhesive then sprinkled on top. The sintering of the first stage of the process in each case may be carried out in an oven or with the use of infra-red radiant heaters. Two stage processes may result in materials of somewhat lower bond strength, but this appears to be compensated for by the fact that higher permeabilities can be obtained.

Some examples will now be given:

Example 1

A composite was formed by needling 60 grams per square metre of an even fibrous fleece consisting of 85% nylon and 15% viscose fibre onto a 26 grams per square metre cotton scrim backing, and then impregnating the product with a dispersion of a formulation binder based on Neoprene 842A so as to deposit 60 grams per square metre of binder solids. The impregnated material was dried, vulcanised and washed. Next it was treated with a solution of aluminium acetate, dried and rewashed and thereafter treated with a dispersion of Scotchgard FC 208 resin to provide a finish which after curing will repel oil and water. The purpose of immersing the material in the aluminium acetate solution and then drying it was to deposit a chemical which would prevent the fluorocarbon from penetrating deeply into the material, since as far as possible the fluorocarbon should be retained on the surface.

The scrim side of the composite was then sprinkled with a mixture of powdered activated charcoal and powdered polyamide resin to give 40 g./m.$^2$ of charcoal and 15 g./m.$^2$ of polyamide. The activated charcoal, derived from nut shells, had a particle size range of 100 to 180 microns. The polyamide resin was non-plasticised polymer sold under the trademark Platamid H105, with a particle size of 300 to 500 microns.

The second substrate was a "spun-bond" non-woven material of weight 35 grams per square metre sold under the trade mark Vliesette 235. This material shows excellent fibre distribution and is free from large voids. The second substrate was put onto the powdered scrim side of the composite, and the whole then bonded together by pressing for 10 seconds in an electrically heated press, the press head of which had a surface temperature of 185° C.

The protective material thus produced had a permeability of more than 100 linear feet of air per minute at a pressure difference of ½ inch water gauge, was oil-and-water repellent and had good toxic gas absorption. It was eminently suitable for making up into protective garments, the composite side of the material forming the outer surface of the garment, and the spun bond forming the inner lining.

The process described in this example is readily adaptable to continuous operation. The bonding can be carried out, for example, by passing the assembly between heated rollers, or by pressing in contact with a heated cylinder, as on a Palmer dryer. If bonding is carried out in the presence of steam, then lower temperatures can be used than the 185° C. head temperature quoted.

Example 2

A mixture of charcoal powder and fine polyethylene powder was prepared by intimately mixing together:

70 parts by weight of charcoal powder of maximum particle size 180 microns and containing 70% by weight above 100 microns,
30 parts by weight of a polyethylene powder of Melt Flow Index 1.5 and particle size 1–75 microns with 90% below 25 microns, sold under the trademark Coathylene 3525.

This mixture was sprinkled onto the scrim side of the fluorocarbon-treated composite used in Example 1 to give a deposit of 40 g./m.$^2$ of charcoal and 17 g./m.$^2$ of polyethylene. On top of this deposit was sprinkled 20 g./m.$^2$ of Platamid H.105P.

A second substrate, Vliesette 235, was put onto the powdered scrim side of the first substrate, and the assembly then bonded together by pressing for 15 seconds in an electrically heated press, the press head of which had a surface temperature of 150° C.

In the course of the pressing, the large particles of adhesive strike through the charcoal layer and bond the assembly together. At the same time, the fine polyethylene powder is activated and bonds the charcoal particles to themselves and to some extent to the two substrates. In this way the charcoal is fixed within the assembly.

The material showed an absorption of toxic gas only some 5% less than that of a similar material prepared without polyethylene powder, and there was no loss of charcoal on flexing under wet or dry conditions.

Example 3

The procedure of Example 2 was repeated, with the exception that a non-woven fabric of bonded polyamide fibre was used as the first substrate; this fabric had a weight of 75 g./m.$^2$, and consisted of 60% by weight of 1½ denier bi-component fibre sold under the trademark Heterofil and 40% by weight of 1½ denier nylon 66 fibre, the fabric having been bonded by heating. The fabric was rendered oil- and water-repellent by treatment with a solution of aluminium acetate and drying and then treatment with Scotchgard FC208 and drying and baking.

The material showed excellent charcoal bonding and toxic gas absorption.

Example 4

The procedure of Example 3 was repeated, with the exception that the polyamide adhesive was replaced by a particulate thermoplastic adhesive based on polyvinyl acetate having a particle size of 200 to 700 microns, used at 20 g./m.$^2$.

Excellent results were again obtained.

Example 5

The procedure of Example 3 was repeated, with the exception that the adhesive used was shellac particles of 300 to 500 microns size, and the polyethylene powder was replaced by another polyethylene powder having a Melt Flow Index of 200.

The assembly was pressed on a Hoffman press at approximately 100° C. for ten seconds, and an excellent protective material was obtained.

Example 6

The procedure of Example 3 was repeated, with the exception that the polyethylene microfine powder was replaced by a chlorinated polyethylene powder having similar physical characteristics. The assembly was pressed on an electrically heated press for ten seconds, the head temperature of the press being 180° C.

An excellent protective material was again obtained.

Example 7

The procedure of Example 3 was repeated, with the exception that the Vliesette 35 was replaced by a non-woven fabric of viscose bonded with polyvinyl alcohol and having a weight of 26 g./m.$^2$, the polyvinyl alcohol being insolubilized by treatment with melamine-formaldehyde resin. Though the non-woven fabric was of more open structure than Vliesette, the charcoal was retained within the structure, and the product has good gas absorption properties.

Example 8

A mixture of charcoal powder and microfine polyethylene powder was prepared by intimately mixing together:

70 pts. by weight of charcoal powder of maximum particle size, 180 microns, and containing 70% by weight above 100 microns,
30 pts. by weight of Coathylene 3525.

This mixture was sprinkled on to the scrim side of the fluorocarbon-treated composite used in Example 1 to give a deposit of 40 g./m.$^2$ charcoal plus 17 g./m.$^2$ polyethylene.

The powdered composite was heated in an oven so that activation of the polyethylene occurred just sufficiently to bring about the necessary degree of charcoal bonding. In a second stage this coated, charcoal-bonded composite was then sprinkled with 20 g./m.$^2$ of shellace of particle size 300–500 microns.

A second substrate, Vliesette 235, was laid on top and heat and pressure applied to bond the assembly together. On pressing, the relatively large shellac particles strike through the charcoal layer bonding the substrates together. This stage takes place without significant re-activation of the polyethylene due to the difference in melt and flow characteristics of the adhesive and the microfine powder.

Bonding was effected by pressing on a Hoffman press for 10 seconds at 100° C. under light pressure.

The material had good toxic gas absorption properties.

Example 9

The procedure of Example 8 was repeated except that the polyethylene was replaced by a microfine polypropylene powder and the adhesive by Platamid H.105P. A higher activation temperature was required for the polypropylene and bonding was achieved by pressing on an electric press with a surface temperature of 150° C. for 15 seconds.

Again bonding was carried out without significant re-activation of the microfine powder, and a protective material was produced which had good toxic adsorption properties.

In these Example 8 and 9, the process relies for its success on the choice of a powdered adhesive requiring bonding conditions which do not re-activate the microfine powder. The higher the activating temperature of the microfine powder, the wider is the choice of powdered adhesive.

We claim:
1. A garment protective against toxic chemicals comprising two air-permeable substrates, and powdered activated charcoal and a powdered thermoplastic adhesive interposed between said substrates, said substrates being heat-sealed together by said thermoplastic powder.

References Cited

UNITED STATES PATENTS

| | | | |
|---|---|---|---|
| 3,474,600 | 10/1969 | Tobias | 55—524 |
| 2,748,019 | 5/1956 | Schramm | 117—31 |
| 2,979,157 | 4/1961 | Clark | 55—387 |
| 2,984,584 | 5/1961 | Glarum | 117—76 |
| 3,091,550 | 5/1963 | Doying | 117—76 |
| 3,179,544 | 4/1965 | Smith-Johannsen | 156—55 |
| 3,502,537 | 3/1970 | Pearson et al. | 161—87 |
| 3,586,596 | 6/1971 | Ainsworth et al. | 161—87 |

DANIEL J. FRITSCH, Primary Examiner

R. A. DAWSON, Assistant Examiner

U.S. Cl. X.R.

2—2; 55—514, 524; 117—135.5, 226; 128—132 R, 142.5, 142.6; 156—276, 283; 161—158, 162